Jan. 31, 1939.  E. H. RISTOW  2,145,664
BASEBALL CHART
Filed April 5, 1937
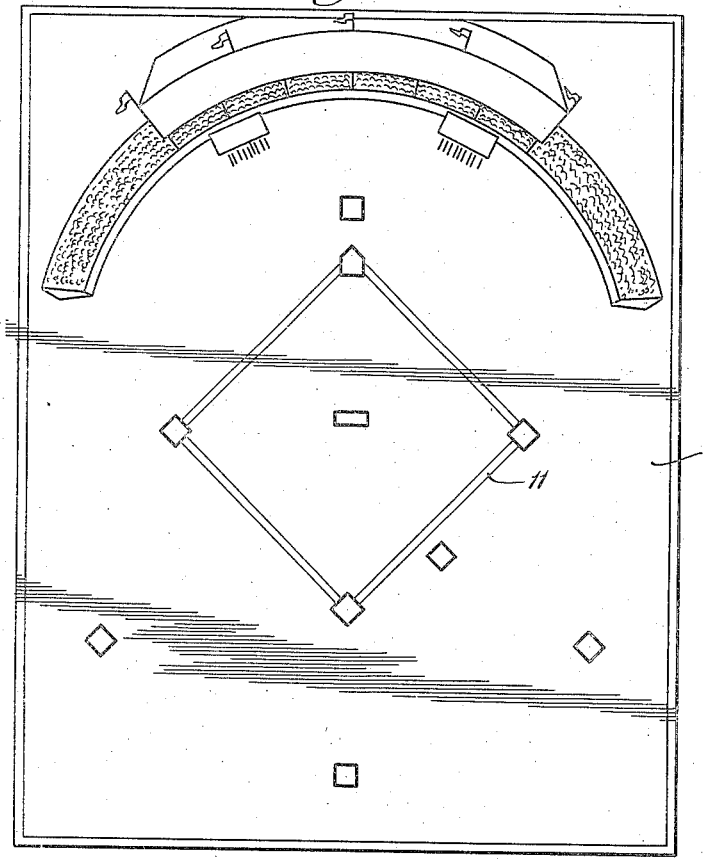
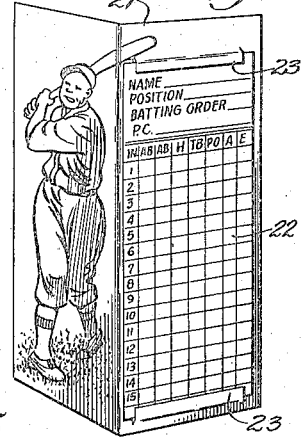
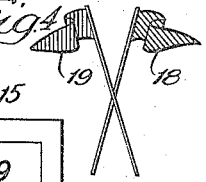
Inventor:
Edwin H. Ristow,
By Banning & Banning
Attorneys Patented Jan. 31, 1939

2,145,664

UNITED STATES PATENT OFFICE 2,145,664

BASEBALL CHART

Edwin H. Ristow, Oshkosh, Wis.

Application April 5, 1937, Serial No. 135,048

5 Claims. (Cl. 116—120)

This invention is directed to a baseball chart representing the playing field, which together with suitable instrumentalities presently to be described enables a baseball game, reported over a radio or the like, to be visually portrayed during the progress of the game in such a way as to enhance the interest in the proceedings. The device is so designed as to permit the various plays to be quickly and accurately portrayed with precision and without danger of mistake or confusion in the registering of the plays concurrently with their announcement.

Further objects and details will appear from the description of the invention in conjunction with the accompanying drawing, wherein,—

Figure 1 is a plan view of the chart representing the playing field;

Fig. 2 is a plan view of the two pit cards providing for the positioning of the players coming to bat and after batting;

Fig. 3 is an enlarged detail of one of the counters;

Fig. 4 is a view of the flags for indicating whether a player has been put out or has scored;

Fig. 5 is a view of a marker for temporarily indicating the last man to bat in a given inning; and Fig. 6 is a view showing a modification of one of the counters.

The chart 10 is in the form of a record or card having portrayed thereon a baseball diamond 11 with the bases and positions of the players properly indicated. The chart may also be suitably embellished with the representation of a grandstand or other necessary features, tending to enhance the attractiveness of the display, and if desired the playing field may be in the form of an actual photographic reproduction of the grounds of a favorite team.

Each of the nine players constituting each of the respective teams is represented by a counter 12 in the form of a manikin configured to represent an actual baseball player, and it is preferred to color the uniforms of the opposing teams in contrasting colors or the like to distinguish the players.

In order to identify each player on each of the teams a suitable badge 13 is provided which may be hung around the neck of the player by a loop 14, or attached by a clip or other suitable fastening, and upon the card is inscribed or printed the name of the player, his position, and a number indicating his place in the batting order.

In order to maintain the numbered players in proper sequence in the batting order, two pit cards 15 are provided, one of which may be inscribed to indicate the home team and the other the visiting team. Each pit card is divided into two areas 16 and 17, each of which is in turn subdivided into nine spaces numbered consecutively from 1 to 9. Although it is preferred to provide separate pit cards for each of the teams, this is not essential since a single pit card may serve in turn to maintain the batting order of the team at bat.

In order to indicate whether a batter makes a run or goes out, separate sets of flags 18 and 19 are provided in contrasting colors, preferably green and red, the green flags indicating the identity of players who have made runs and the red flags the identity of the players who have been put out during the course of an inning.

In order to indicate the last man of a team at bat during a particular inning, one or more markers 20 are provided for positioning upon the appropriately numbered space of the pit card, so that the proper batting sequence can be initiated at the beginning of the next inning. If desired, additional identifying badges may be kept available upon which to inscribe the names of players substituted for those appearing in the original batting order, and if a more elaborate display is desired the manikins may be shown in various postures indicative of their playing position, or actual portraits of individual players may be employed to enhance the interest in the display.

In use, the board or chart is conveniently positioned in proximity to a radio or other suitable form of an announcer, and the players on each team are identified by suitably inscribed and numbered badges, and the players of the team at bat are positioned in sequence upon the first numbered area 16 of the appropriate card, so that as the players are called to bat in numbered sequence they may be lifted from the numbered spaces in the first area of the pit card and stood in position at the home plate during the period at bat, or until the player has been put out or has gotten on base.

If the player at bat is put out, the manikin is marked with a red flag inserted into the socket hole provided therefor and placed upon the appropriately numbered space in the second area 17 of the pit card.

If the player makes a hit and gets on base, the manikin will be suitably moved to the appropriate base and the manikin representing the next batter in numbered sequence will be placed in batting position.

If the player on base succeeds in making a run, the manikin will be marked with a green flag and placed on the appropriately numbered space in the second area of the pit card, and thus the game will progress throughout the inning, the flags indicating the number of runs and outs being made, so that at the conclusion of the inning a visible record of the result will be presented.

After the team at bat has concluded its inning the players representing the opposing team will be brought in from the field and positioned in numerical sequence upon the pit card provided for the opposing team, and the plays will continue as before.

In order to preserve a record of the last man out on a given team during a particular inning so that the first man at bat during the next succeeding inning will be indicated it is preferred to provide a disk or other appropriate marker 20 which may be positioned in the appropriately numbered space on the pit card to temporarily indicate the last man out during the inning and thus properly establish the beginning of the batting sequence in the next succeeding inning.

The provision of the pit cards divided into two correspondingly numbered areas permits the proper batting order to be maintained throughout the inning, thus obviating the danger of mistake or confusion in locating the proper batter, and this is particularly important in order to permit the moves upon the chart to quickly and accurately follow the announcements of the game and at the same time maintain a visible indication of the batting order and a visible record of the runs and outs made during the progress of the inning. The chart will thus at each instant display an accurate representation of current conditions developing during the progress of the game, which will greatly add to the interest and intelligent understanding of the reports announced by radio.

Although the game has heretofore been described in form to be utilized in a private home or room, a similar form of chart and markers may be employed in enlarged form for public display; and although the invention has been described with particularity as to detail in the form, shape and appearance of the various instrumentalities employed, it will be understood that variations in these details may be made without departing from the basic principles of the invention. In particular, although it is desired that the pit cards shall be formed separately from the main chart for convenience in use, it is not essential that this arrangement be employed, since the spaces provided by separate pit cards might be provided upon the board of the main chart without modification in the principles involved in carrying out the movements and operations heretofore described.

Of course, it will be understood that a general record of the game by innings may be maintained on any convenient form of score board or score card of the character commonly used for a like purpose, but if it is desired to maintain a special record of each player's performance in immediate association with the counter personifying the particular player, a counter of the character illustrated in Fig. 6 may be employed in which a portrait of the player is supplemented by a backing card 21 for the reception of a removable record card 22 adapted to be slipped into place within a slot or pocket 23 in the angularly disposed backing card 21 which may serve as a prop for the support of the portrait. However, the individual record card may be affixed to the back of the manikin shown in Fig. 3.

In either event, the record card will be suitably subdivided to give the name, position and batting order of the player, and a record by innings showing times

| | |
|---|---|
| At bat | A B |
| Hits | H |
| Total bases | T B |
| Put outs | P O |
| Assists | A |
| Errors | E | which record may be further elaborated if desired. If a player makes a base hit, a single mark is made in the column A B, and each advance to a succeeding base may be indicated by an additional mark at right angles to the last, until a score is indicated by the completion of a diagonally disposed square representing the diamond. Two columns inscribed A B are provided in the event the player comes twice to bat within a single inning.

Additional modifications or elaborations of similar character may be introduced, and in cases where the manikins are in the form of individual portraits of particular players, the player's record or significant facts regarding his life may be imprinted on the back of the manikin to enhance the interest, but such features are not regarded as essentials of the present invention and may be employed or omitted as desired.

The invention, therefore, is one which may be utilized either in simplified form or in a more extended and elaborate form, depending upon the price to be charged for the set and the extent to which the purchaser's interest is centered upon the individual records of particular players or teams and the closeness with which he desires to follow the minutiae of the game itself.

I claim:

1. In a device for visualizing the report of a baseball game, the combination of a chart having portrayed thereon the representation of a baseball field, two groups of nine counters each representing the players of opposing teams, an identifying symbol for each counter representing the position at bat in the batting order and adapted to be detachably connected to the appropriate counter, a surface divided into two areas each having nine corresponding sequentially identified spaces indicating the sequence in batting order, the first area being adapted to receive the counters in corresponding sequence before batting and the second area being adapted to receive the counters in the same maintained sequence after batting, and symbols adapted to be detachably applied to the counters after batting to indicate the result of the batter's efforts.

2. In a device for visualizing the report of a baseball game, the combination of a chart having portrayed thereon the representation of a baseball field, two groups of nine counters each representing the players of opposing teams, an identifying symbol for each counter representing the position at bat in the batting order and adapted to be detachably connected to the appropriate counter, a surface divided into two areas each having nine corresponding sequentially identified spaces indicating the sequence in batting order, the first area being adapted to receive the counters in corresponding sequence before batting and the second area being adapted to receive the counters in the same maintained sequence after batting, symbols adapted to be detachably applied to the counters after batting to indicate the result of the batter's efforts, and a marker adapted to be placed upon an appropriate space in the pit surface to indicate the last man at bat in a given inning.

3. In a device for visualizing the report of a baseball game, the combination of a chart having portrayed thereon the representation of a baseball field, a set of nine counters representing the players of a team and each having applied thereto a removable visual indicator showing the player's position in the batting order, and a pit surface divided into nine spaces sequentially arranged to visually indicate the batting order and adapted to have the correspondingly marked counters positioned thereon prior to batting and removed in sequence therefrom as a particular player comes to bat, and removable symbols adapted to be applied to the individual counters to visually indicate the result of the player's efforts after coming to bat.

4. In a device for visualizing the report of a baseball game, the combination of a chart having portrayed thereon the representation of a baseball field, a set of nine counters representing the players of a team and each having applied thereto a removable visual indicator showing the player's position in the batting order, and a pit surface divided into nine spaces sequentially arranged to visually indicate the batting order and adapted to have the correspondingly marked counters positioned thereon prior to batting and removed in sequence therefrom as a particular player comes to bat, and removable symbols adapted to be applied to the individual counters to visually indicate the result of the player's efforts after coming to bat, one set of symbols representing players who have been put out and another set of visually distinguishable symbols representing players who have scored.

5. In a device for visualizing the report of a baseball game, the combination of a chart having portrayed thereon a representation of a baseball field, two sets of nine counters each representing the players of opposing baseball teams, badges adapted to be affixed to the respective counters and inscribed to indicate the identity and batting order of the players represented by the respective counters, and a pair of pit cards each divided into two areas and each area subdivided into nine spaces sequentially inscribed to indicate the sequence in batting order, the first area being adapted to have the correspondingly identified counters placed thereon before batting in the indicated batting order and the second area being adapted to have the correspondingly identified counters placed thereon after batting in the indicated batting order, and two sets of visually distinguishable detachable markers adapted to be affixed to the counters after the individual players have come to bat to indicate men put out in the one case and men scoring in the other case.

EDWIN H. RISTOW.